US008772667B2

(12) United States Patent
Yang et al.

(10) Patent No.: US 8,772,667 B2
(45) Date of Patent: Jul. 8, 2014

(54) PLASMA ARCH TORCH CUTTING COMPONENT WITH OPTIMIZED WATER COOLING

(75) Inventors: Yong Yang, Hanover, NH (US); David Jonathan Cook, Bradford, VT (US); E. Michael Shipulski, Etna, NH (US)

(73) Assignee: Hypertherm, Inc., Hanover, NH (US)

( * ) Notice: Subject to any disclaimer, the term of this patent is extended or adjusted under 35 U.S.C. 154(b) by 1084 days.

(21) Appl. No.: 12/028,768

(22) Filed: Feb. 8, 2008

(65) Prior Publication Data

US 2008/0210669 A1 Sep. 4, 2008

Related U.S. Application Data

(60) Provisional application No. 60/900,435, filed on Feb. 9, 2007.

(51) Int. Cl.
*B23K 10/00* (2006.01)
*H05H 1/34* (2006.01)
*H05H 1/28* (2006.01)

(52) U.S. Cl.
CPC ......... *H05H 1/34* (2013.01); *H05H 2001/3436* (2013.01); *B23K 10/00* (2013.01); *H05H 2001/3442* (2013.01); *H05H 2001/3457* (2013.01); *H05H 1/28* (2013.01)
USPC ............... 219/121.48; 219/121.49; 219/121.5

(58) Field of Classification Search
USPC .............. 219/121.39, 121.48–121.54, 121.57
See application file for complete search history.

(56) References Cited

U.S. PATENT DOCUMENTS

| 5,362,939 | A | * | 11/1994 | Hanus et al. ............. 219/121.59 |
| 5,396,043 | A | | 3/1995 | Couch, Jr. et al. ......... 219/121.5 |
| D359,058 | S | * | 6/1995 | Carkhuff ..................... D15/144 |
| 5,628,924 | A | | 5/1997 | Yoshimitsu et al. |
| 5,660,743 | A | * | 8/1997 | Nemchinsky ............. 219/121.5 |
| 5,747,767 | A | | 5/1998 | Severance et al. |
| 5,886,315 | A | * | 3/1999 | Lu et al. ................... 219/121.57 |
| 6,156,995 | A | * | 12/2000 | Severance, Jr. ............ 219/121.5 |
| 6,268,583 | B1 | | 7/2001 | Yamaguchi et al. |

(Continued)

FOREIGN PATENT DOCUMENTS

| CN | 1608782 A | 4/2005 |
| CN | 1771766 A | 5/2006 |

(Continued)

OTHER PUBLICATIONS

International Search Report and the Written Opinion of the International Searching Authority, or the Declaration for International Patent Application No. PCT/US2008/072532, date of mailing Jul. 29, 2009, 12 pages.

(Continued)

*Primary Examiner* — Brian Jennison
(74) *Attorney, Agent, or Firm* — Proskauer Rose LLP

(57) ABSTRACT

A nozzle or retaining cap for a plasma arc torch that includes a surface defining a conductive contact portion for exchanging heat with an adjacent torch component. The adjacent torch component can be a retaining cap, electrode or nozzle. The surface of the nozzle or retaining cap can also at least partially define a cooling channel having a curvilinear surface. A sealant portion can be positioned between the conductive contact portion and the cooling channel. The sealant portion can form or create a fluid barrier between the cooling channel and the conductive portion.

23 Claims, 9 Drawing Sheets

(56) References Cited

U.S. PATENT DOCUMENTS

| | | |
|---|---|---|
| 6,320,156 B1 | 11/2001 | Yamaguchi et al. |
| 7,005,599 B2 * | 2/2006 | Faslivi et al. ............ 219/121.49 |
| 7,126,080 B1 | 10/2006 | Renault et al. |
| 2005/0082263 A1 | 4/2005 | Koike et al. .............. 219/121.49 |
| 2005/0133484 A1 | 6/2005 | Delzenne |
| 2006/0289398 A1 * | 12/2006 | Cook et al. ................ 219/121.5 |
| 2007/0045245 A1 | 3/2007 | Brandt et al. |
| 2008/0210669 A1 | 9/2008 | Yang et al. |

FOREIGN PATENT DOCUMENTS

| | | |
|---|---|---|
| DE | 29710821 U1 | 6/1997 |
| DE | 297 10 821 | 9/1997 |
| EP | 1 524 887 | 4/2005 |
| EP | 1531652 A2 | 5/2005 |
| EP | 1542514 A2 | 6/2005 |
| EP | 2 034 805 | 3/2009 |
| KR | 10-2010-0646915 | 11/2006 |
| WO | WO 2008/087522 | 7/2008 |
| WO | WO 2009/099463 | 8/2009 |

OTHER PUBLICATIONS

International Search Report and the Written Opinion of the International Searching Authority, or the Declaration for International Patent Application No. PCT/US2008/053518, date of mailing Nov. 10, 2008, 16 pages.

P. Freton et al., "Complementary experimental and theoretical approaches to the determination of the plasma characteristics in a cutting plasma torch", J. Phys. D.: Appl. Phys., vol. 36 pp. 1269-1283, 2003.

* cited by examiner

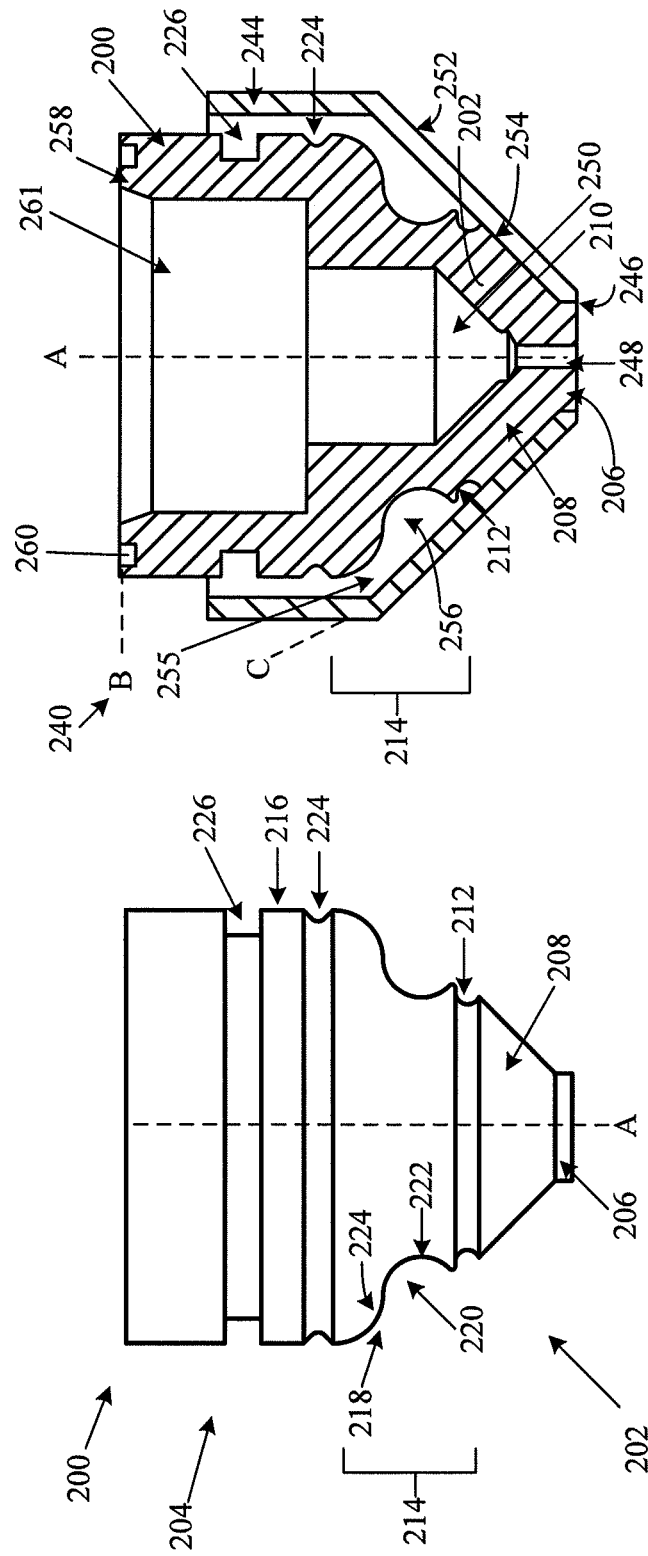

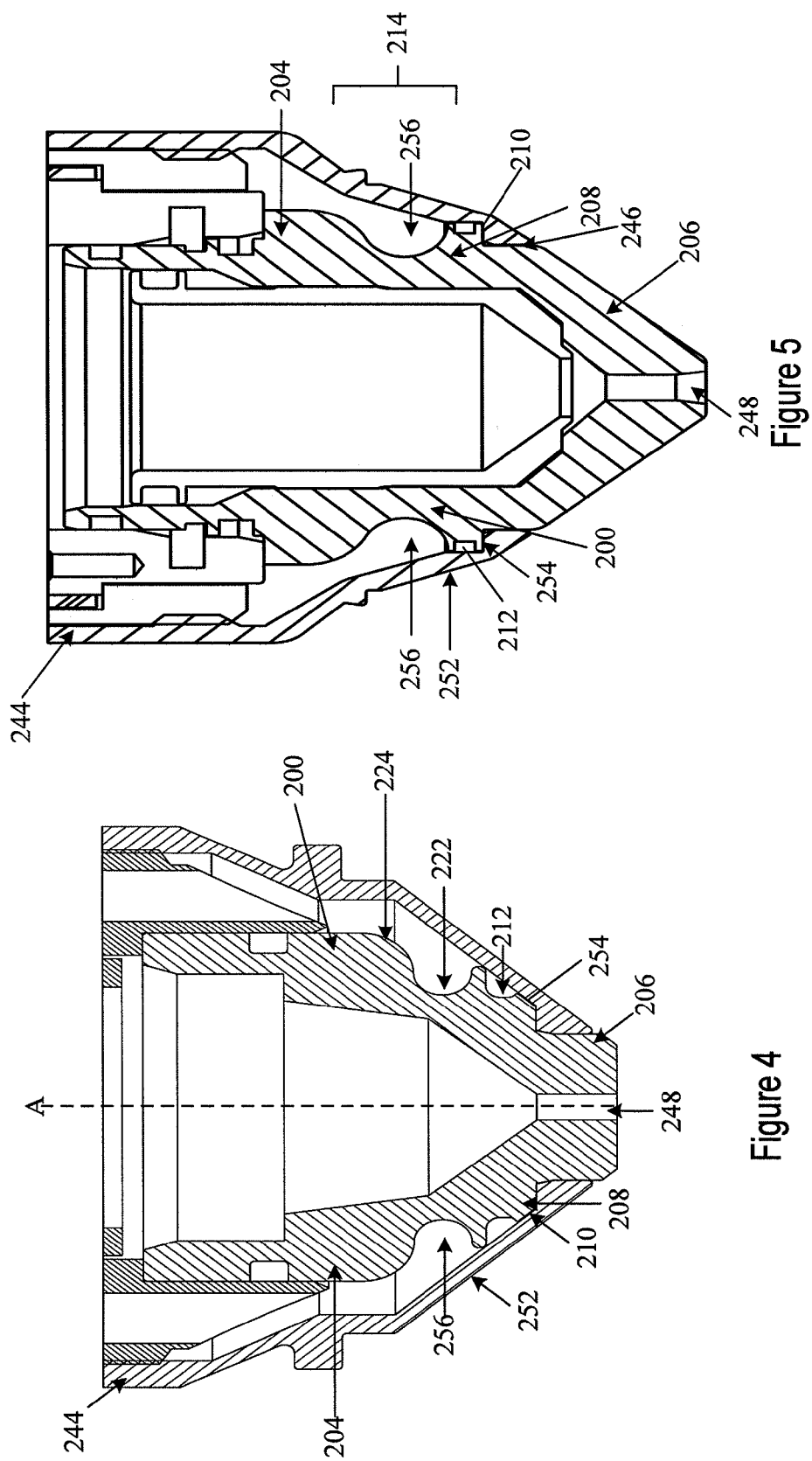

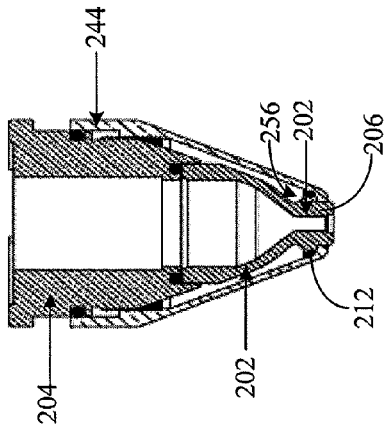
Figure 8A
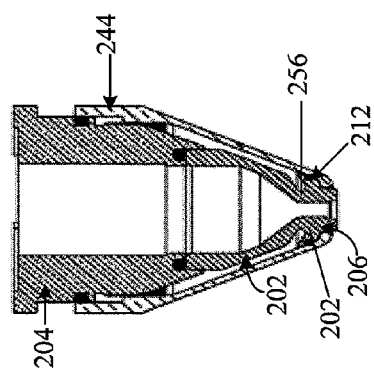
Figure 8C
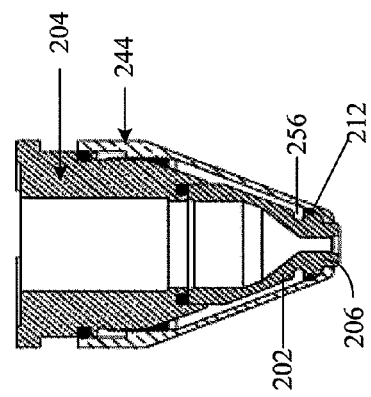
Figure 8B
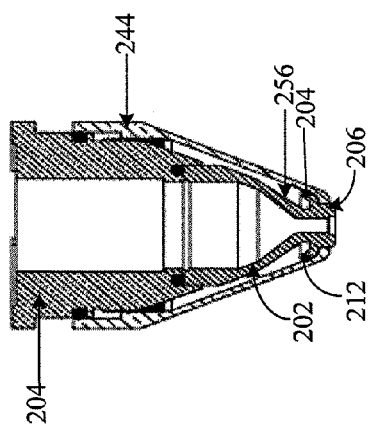
Figure 8D
Figure 8E

PLASMA ARCH TORCH CUTTING COMPONENT WITH OPTIMIZED WATER COOLING

CROSS-REFERENCE TO RELATED APPLICATIONS

This application claims the benefit of U.S. Patent Application No. 60/900,435, which was filed on Feb. 9, 2007, titled "Plasma Cutting Component With Optimized Water Cooling," the entire contents of which are hereby incorporated herein by reference.

TECHNICAL FIELD

The invention generally relates to the high-temperature processing of metallic materials, including the cutting of materials using plasma arc cutting torches. More specifically, the invention relates to improved design and cooling techniques that can enhance the performance or life expectancy of plasma torches and components thereof.

BACKGROUND

Plasma arc torches are widely used for workpiece processing, e.g., the cutting, piercing, and/or marking of metallic materials (e.g., elemental metals, metal alloys. etc.). A plasma arc torch generally includes an electrode mounted within a body of the torch (e.g., a torch body), a nozzle having a plasma exit portion (sometimes called an exit orifice, exit bore, or exit port) also mounted within the torch body, electrical connections, fluid passageways for cooling fluids, shielding fluids, and arc control fluids, a swirl ring to control fluid flow patterns in a plasma chamber formed between the electrode and nozzle, and a power supply. The torch produces a plasma arc, which is a constricted ionized jet of a plasma gas with high temperature and high momentum (e.g., an ionized plasma gas flow stream). Gases used in the plasma arc torch can be non-oxidizing (e.g., argon or nitrogen) or oxidizing (e.g., oxygen or ambient air).

In operation, a pilot arc is first generated between the electrode (e.g., cathode) and the nozzle (e.g., anode). Generation of the pilot arc may be by means of a high frequency, high voltage signal coupled to a DC power supply and the plasma arc torch, or any of a variety of contact starting methods. In some configurations, a shield is mounted to the torch body to prevent metal that is spattered from the workpiece (sometimes referred to as slag) during processing from accumulating on torch parts (e.g., the nozzle or the electrode). Generally, the shield includes a shield exit portion (also called a shield orifice) that permits the plasma jet to pass therethrough. The shield can be mounted co-axially with respect to the nozzle such that the plasma exit portion is aligned with the shield exit portion.

To achieve high plasma cutting speeds with good cut quality, a nozzle design that facilitates high current density is generally required. High current density has been achieved in plasma torches by reducing the size (e.g. diameter) of the nozzle orifice bore and/or extending the length of the nozzle bore to constrict the flow area of the plasma arc to increase the energy density (amps/in$^2$) of the plasma arc. Nozzles with relatively high current densities and/or relatively high length/diameter ratios encounter relatively higher heat fluxes inside the nozzle bore from the plasma arc. The higher heat flux can lead to overheating of the nozzle, oxidation erosion of the nozzle material (e.g., copper), or local melting of the nozzle material. Higher heat flux can also lead to double arcing where the nozzle is eroded by series arcing between the nozzle, an electrode and a workpiece. Damage to the nozzle from overheating and double-arcing can cause the plasma jet or arc to widen and/or diverge due to less constriction by the nozzle shape, resulting in defects in cut quality such as increased angle variation, wide kerf, and excessive dross.

Generally, the erosion rate at a nozzle orifice is affected by the cooling efficiency at the nozzle orifice. Efficient cooling at this location can help to maintain a relatively low temperature, which leads to a lower erosion rate. For water-cooled nozzles used in high current plasma torches, cooling can include thermal conduction through solid metal or thermal convection through a coolant at or passed over the exterior surface of the nozzle. In some designs, additional cooling can be provided using shielding gas on an external surface of nozzle, for example, as is accomplished with the HPR™ torch designs of Hypertherm, Inc. of Hanover, N.H. and torches sold by ESAB of Florence, S.C., both of which employ relatively high electrical currents. Generally, cooling a nozzle with a gas flow is weaker or less effective than cooling the nozzle with water or another liquid.

The heat that is absorbed by the tip of a nozzle near the exit orifice (mostly at the orifice wall) needs to be removed. Heat removal is accomplished by both thermal conduction, and by water convection at the upper part of nozzle and/or thermal convection with the shielding gas (if the nozzle cooling by gas is not negligible). In most cases the gas cooling function is negligible compared with water cooling, so all or most of the total heat transfer through the nozzle is performed by the water cooling. In these situations, the heat transfer rate from the nozzle orifice to the cooling water is controlled mainly by the temperature gradient at the nozzle tip (e.g., near the nozzle exit orifice), the temperature difference between the solid/liquid interface (e.g., between the nozzle material, such as copper and the cooling liquid such as water) and initial cooling water, and the convection heat-transfer coefficient. This can be described by two governing relations, namely the thermal conduction equation (Equation 1 below) and the thermal convection equation (Equation 2 below).

$$\frac{Q}{A_{Orifice}} = -k \frac{T_{S/L} - T_{Orifice}}{\Delta X} \quad \text{(Equation 1)}$$

where:

Q is the total heat flux at the nozzle orifice, assuming heat is transferred only through the nozzle orifice wall;

$A_{Orifice}$, is the surface area of the nozzle orifice bore;

k, is the thermal conductivity of the nozzle material;

$T_{S/L}$, is the temperature at the interface of the nozzle and the cooling fluid (e.g., water);

$T_{Orifice}$, is the temperature at the nozzle orifice bore, assuming a uniform temperature; and $\Delta X$, is the effective distance from nozzle orifice to solid liquid interface.

$$\frac{Q}{A_{S/L}} = h(T_{S/L} - T_0) \quad \text{(Equation 2)}$$

where:

$A_{S/L}$ is the area of the interface of the nozzle and the cooling fluid;

h, is the convection heat-transfer coefficient of the nozzle material;

$T_{S/L}$, is the temperature at the interface of the nozzle and the cooling fluid; and $T_0$, is the initial temperature of the cooling fluid.

The conventional design approach for nozzle cooling is to bring the coolant material as close to the nozzle exit orifice as possible, for example, by reducing the distance therebetween, e.g., the $\Delta X$ term in Equation 1. However, reducing the distance between the coolant and the nozzle exit orifice can be limited by the ability of thermal convection to maintain the solid/liquid interface temperature at an acceptable level. There have been several approaches to make the coolant seal.

FIG. 1 depicts a partial cross-sectional view of a typical design of a system 100 for cooling a tip 105 of a nozzle 110. The system 100 is generally representative of the Proline 2200™, 200-amp nozzle sold by Kaliburn, Inc., of Charleston, S.C. The system 100 includes a nozzle 110 and a nozzle retaining cap 115 that is detachably mounted to a torch body (not shown) to secure the nozzle 110 relative to the torch body. A full cross-sectional view of the system 100 would include a mirror image of the components of the system 100 disposed symmetrically about the centerline or longitudinal axis A. The tip 105 defines an exit orifice portion 120 through which a plasma jet (not shown) exits the nozzle 110. The tip 105 also defines a recessed portion 125 into which a sealing component 130 (e.g., an o-ring) is disposed to form a fluid-tight seal between the nozzle 110 and the nozzle retaining cap 115. The tip 105 also defines a first shoulder portion 135 configured to mate with a corresponding flat portion 140 of the nozzle retaining cap 115 to form a metal-to-metal interface 143 therebetween. The interface 143 provides a heat conduction path between the nozzle 110 and the nozzle retaining cap 115. A rear portion 145 of the nozzle 110 cooperates with a corresponding rear portion 150 of the nozzle retaining cap 115 to form a chamber 155 through which a cooling fluid (not shown) flows.

The interface 143 secures the nozzle 110 to the torch and positions the nozzle 110 relative to the longitudinal axis A. The system 100 is generally representative of the PBS-75/PBS-76 nozzle sold by Kjellberg Elektroden und Maschinen GmbH, of Finsterwalde, Germany. Several drawbacks exist with respect to the system 100. For example, the configuration of the system 100 results in insufficient cooling of the nozzle tip 105. The recessed portion 125 overheats, resulting in overheating and/or burning of the sealing component 130. Failure of the sealing component can lead to failure to create a fluid-tight seal between the nozzle 110 and the nozzle retaining cap 115, resulting in leakage of the cooling fluid, premature failure of the nozzle 110 or nozzle retaining cap 115, and/or damage to other torch components not shown in FIG. 1A (e.g., the torch electrode or shield). Moreover, the recessed portion 125 results in less metal-to-metal contact between the nozzle 110 and nozzle retaining cap 115, which reduces the surface area of physical contact therebetween.

The system 100 also results in a "stagnation zone" 158 in the chamber 155 near the interface 143. The fluid flow in the "stagnation zone" 158 is slower relative to other portions "stagnation zone" 158 exhibits fluid flow resistance that hinders relatively cooler fluid from FIG. 1B is a partial cross-sectional view of a design of a second or alternative system 160 for cooling the tip 105' of a nozzle 110'. The system 160 includes the nozzle 110' and the nozzle retaining cap 115'. A full cross-sectional view of the system 160 would include a mirror image of the components of the system 160 disposed symmetrically about the centerline or longitudinal axis A. The tip 105' defines an exit orifice portion 120' through which a plasma jet (not shown) exits the nozzle 110'. The tip 105' includes a sealing portion 165 in physical contact with a corresponding portion 170 of the nozzle retaining cap 115' to form a metal-to-metal interface 175 therebetween. A rear portion 180 of the nozzle 110' cooperates with a corresponding rear portion 185 of the nozzle retaining cap 115' to form a chamber 155' through which a cooling fluid (not shown) flows.

The interface 175 secures the nozzle 110' to the torch and positions the nozzle 110' relative to the longitudinal axis A. The interface 175 generally also acts as a fluid seal to hinder the cooling fluid flowing in the chamber 155' from leaking. Several drawbacks exist with respect to the system 160. For example, difficulties exist in manufacturing or machining the nozzle 110' and/or the nozzle retaining cap 115' to achieve a fluid-tight seal at the metal-to-metal interface 175. As a result, the interface 175 tends to leak cooling fluid during operation (e.g., as the operating temperature of the nozzle 110' (and tip 105') increases. After a leak has developed between the nozzle 110' and the nozzle retaining cap 115', both generally must be replaced. Moreover, failure of the interface as a seal 175 can result in damage to the torch electrode (not shown) and a shield (not shown), which generally also require replacement.

Generally, the nozzle 110' and the nozzle retaining cap 115' are manufactured from different materials. For example, the nozzle 110' is frequently made of copper or copper alloys, and the retaining cap 115' commonly made of brass. The different materials have different coefficients of thermal expansion, which affects how quickly the nozzle 110' and the nozzle retaining cap 115' expand during heating (e.g., during torch operation) and contract (e.g., during cooling or thermal relaxation). The interface 175 tends to be sensitive to metal dust and/or the surface finish of the nozzle 110' or the nozzle retaining cap 115'.

SUMMARY

Hence, there is a need for improved cooling of the nozzle and nozzle tip while maintaining the fluid-tight seals to prevent catastrophic failure of the nozzle or nozzle retaining cap. The concepts described herein address these problems via a design that optimizes both conductive and convective cooling of the nozzle while maintaining a fluid-tight seal between the nozzle and nozzle retaining cap.

In general, one aspect of the invention relates to a nozzle for a plasma arc torch. The nozzle includes an exterior surface defining a conductive contact portion for exchanging heat with an adjacent torch component. The adjacent torch component can be a retaining cap or electrode. The exterior surface of the nozzle can also at least partially define a fluid flow path having a curvilinear surface. The fluid flow path can convectively transfer heat from the nozzle to the fluid flowing in the fluid flow path. The curvilinear surface can be a portion of the exterior surface of the nozzle. A sealant portion can be positioned between the conductive contact portion and the fluid flow path. The sealant portion can include a elastomeric seal that is at least partially disposed within a groove positioned on an exterior surface of the nozzle. The sealant portion, including the elastomeric seal and the groove, can form a sealing component or sealing element. The groove can be positioned such that the sealing component forms or creates a fluid barrier between the fluid flow path and the conductive portion. In some embodiments the sealant portion can also include at least one of an applied seal or gasket.

In another aspect there is a retaining cap for a plasma arc torch. The cap includes an interior surface defining a conductive contact portion for exchanging heat with an adjacent torch component. The adjacent torch component can be a nozzle. The interior surface of the retaining cap can at least partially define a fluid flow path having a curvilinear surface. The curvilinear surface can be at least a portion of the interior surface of the retaining cap. A sealant groove can be positioned between the conductive contact portion and the fluid flow path. The sealant groove can also include a elastomeric seal at least partially disposed within the seal to form a sealing component or sealing element. In some embodiments the sealant portion can also include at least one of an applied seal or gasket.

In another aspect of the invention, a convective cooling structure for a plasma arc torch can be disposed in at least one of a nozzle and a retaining cap of the plasma arc torch. The convective cooling structure comprises a concave curvilinear portion defining at least a portion of a channel and a convex curvilinear portion for promoting fluid flow into the concave curvilinear portion. A tangential connection portion is disposed between the convex and concave curvilinear portions.

In a further aspect of the invention, a cooling and sealing structure for coupling and providing heat transfer between adjacent plasma torch components comprises a shoulder portion to provide a contact interface with an adjacent torch component. The contact interface can conductively transfer heat between the adjacent torch components. The structure can also include a convective cooling channel including a convex curvilinear portion, a concave curvilinear portion, and a tangential connection portion disposed between the convex and the concave curvilinear portions. A sealing, or sealant, portion can be positioned between the shoulder portion and the convective cooling channel. The sealing portion can include a groove disposed in a torch component, for example a nozzle or retaining cap, and an elastomeric seal at least partially disposed in the groove. The groove can be positioned so that the seal is not exposed to extreme heat. In some embodiments the sealing portion is positioned proximate or adjacent to the convective cooling channel.

In another aspect, the invention relates to a nozzle for use in a fluid-cooled plasma torch. The nozzle can include a body having an outer perimeter that partially defines a fluid channel, the body can include an end face wherein the end face is perpendicular to a longitudinal axis of the component. In some embodiments a groove extends at least partially through the end face and an elastomeric seal can be disposed within the groove to provide a barrier between a plasma gas flow and the fluid channel. The groove and seal can provide the fluid seal between the plasma gas region of the torch and the water cooled region of the torch. In some embodiments, the groove and seal disposed in the end face of the nozzle can provide a protective barrier that reinforces and supplements a sealing component that is disposed in an exterior surface of the nozzle.

A further aspect of the invention relates to a cooling and sealing structure for coupling and providing heat transfer between plasma torch components. In some embodiments the structure comprises means for conductive cooling between adjacent torch components. The means for conductive cooling can include a contact portion of a torch component. The contact portion can include a shoulder or shoulder surface of a nozzle or the interior surface of a retaining cap. In some embodiments, the shoulder surface can be a square, curved, or angle cut, in some embodiments the shoulder surface has a stepped profile. The cooling and sealing structure can also include means for providing convective cooling of a portion of the plasma torch without stagnation of the cooling fluid. The means for convective cooling can include a cooling channel or fluid chamber that is at least partially defined by a curvilinear surface. In some embodiments the cooling channel can have a bulbous shape. In some embodiments the convective cooling means can be toroidal around a longitudinal axis of a plasma torch or plasma nozzle. The cooling and sealing structure can also include a sealing means for providing a fluid seal. The fluid seal can be formed at least in part by a groove disposed in the exterior surface of a nozzle. In some embodiments the groove is located in the interior surface of a retaining cap.

In another aspect of the invention, a fluid cooled plasma arc torch nozzle comprises a forward portion and a rear portion. The forward portion can include a front face defining an exit orifice. The nozzle can also include a conductive shoulder portion sized to axially align with an adjacent component and a fluid-cooled portion disposed between the shoulder portion and the rear portion. In some embodiments a sealing member can be disposed between the liquid cooling portion and the conductive shoulder portion.

A further aspect of the invention relates to an alignment structure for positioning adjacent components in a plasma torch. In some embodiments the structure includes a step element to provide axial alignment between two adjacent components and a sealing element in cooperation with an angled or curved surface to provide radial alignment between the two adjacent components. In some embodiments the alignment structure can also include a convective cooling channel with a curvilinear portion. The curvilinear portion can have a surface that is at least one of a bulbous or toroidal shape.

Another aspect of the invention includes a plasma arc torch system comprising a power supply, a torch body connected to the power supply, and an electrode disposed within the torch body. In some embodiments the plasma arc torch system includes a torch component with a surface defining a conductive contact portion for exchanging heat with an adjacent torch component and a convective cooling structure comprising a concave curvilinear portion that defines at least a portion of a cooling channel. In some embodiments the torch system can include a controller that controls the flow of gas to the electrode. In some embodiments the torch system comprises a first cooling means for conductive cooling between adjacent torch components, a second cooling means for providing convective cooling of a portion of the plasma torch without stagnation of a cooling fluid flow, and a sealing means disposed between the first cooling means and the second cooling means to provide a fluid seal. In some embodiments the plasma arc torch system can include a controller and gas console.

In a further aspect of the invention, a method of cooling a plasma torch component comprises exchanging heat from a first torch component with an adjacent torch component through a conductive contact portion. In some embodiments the method can include flowing a cooling fluid through a cooling channel having a curvilinear surface, the curvilinear surface configured to prevent fluid stagnation. In some embodiments the method can also include providing a barrier comprising a sealing component between the conductive contact portion and the cooling channel.

An aspect of the invention also relates to a method of manufacturing a plasma torch component comprising forming a surface on a first torch component that defines a conductive contact portion for exchanging heat with an adjacent torch component. The method of manufacturing a plasma arc torch components also can include creating a shaped portion of a cooling channel defined at least in part by one of the first torch component or the adjacent torch component, the shaped portion having a curvilinear surface and positioning a sealant groove between the surface and the shaped portion.

Another aspect of the invention can include a nozzle for a plasma arc cutting torch, wherein the nozzle can have a substantially hollow body capable of receiving an electrode. The nozzle can also comprise an exterior surface that includes a portion having a curvilinear profile that at least partially defines a flow path for a cooling fluid.

A further aspect of the invention relates to a retaining cap for a plasma arc cutting torch, the retaining cap is configured to secure a nozzle within the torch. In some embodiments the retaining cap comprises an interior surface that includes a portion having a curvilinear profile that at least partially defines a flow path for a cooling fluid.

Any of the above aspects can include one or more of the following features. A nozzle can include one or more sealant grooves located in the exterior surface of the nozzle. An elastomeric seal can be at least partially disposed within a sealant groove. The sealant grooves may also be located on a surface on the rear portion of the nozzle or torch component. A sealing component or sealant element can be disposed on the rear face of the nozzle or retaining cap. A sealant groove and an elastomeric seal can form a sealing component. In some embodiments, the elastomeric seal is configured to deform to provide a fluid seal about an angled or curved surface between at least two adjacent torch components. The elastomeric sealing element can also comprise an o-ring. In some embodiments the sealing component can comprise at least one of an o-ring or elastomeric seal. In some embodiments the sealing component is located on at least one of the torch component or the adjacent torch component. And in some embodiments the step element and sealing element are disposed relative to each other to form a single alignment element. In some embodiments a sealing component can be dimensioned and configured to provide a fluid seal between the conductive contact portion and the convective cooling structure.

Any of the above aspects above can also include one or more of the following features. A fluid flow path can be defined at least by a surface of an electrode or retaining cap. The fluid flow path can form at least a portion of a toroidal chamber. The fluid flow path can also include at least a portion of a fluid chamber that includes a convex curvilinear portion and a concave curvilinear portion, the convex curvilinear portion promoting fluid flow into the concave curvilinear portion.

Any of the aspects above can also include one or more of the following features. A conductive contact portion can define a curved or angled contact surface. In some embodiments the contact surface provides axial and radial alignment of a nozzle with an adjacent torch component. The conductive contact portion can include a layer of a conductive metal or metal oxide disposed thereon.

Any of the above aspects can also include one or more of the following features. A shoulder portion can provide radial and axial alignment between at least two of the adjacent torch components. In some embodiments the shoulder portion includes a layer of conductive material along the solid-to-solid interface. The convective cooling channel can include a bulbous portion. And in some embodiments the convective cooling channel comprises a toroidal shape. In some embodiments the conductive contact portion, the convective cooling channel, and the elastomeric seal are part of a single plasma torch component. In some embodiments at least one of a step element and the angled or curved surface element can includes a layer of a thermally conductive material disposed thereon.

Any of the aspects above can include one or more of the following features. A cooling structure can be at least partially disposed within a nozzle. And in some embodiments the cooling structure is at least partially disposed within the retaining cap. In some embodiments a channel is disposed within the nozzle of a plasma arc torch. And in some embodiments the channel intrudes into a wall thickness of the nozzle. And in some embodiments the channel is configured to reduce fluid flow stagnation.

Any of the aspects can include one or more of the following features. A nozzle can comprise a forward portion and a rear portion, the forward portion including a front face defining an exit orifice, a shoulder portion sized to provide conductive heat transfer with an adjacent component, and an elastomeric seal disposed between the shoulder portion and the rear portion, wherein the elastomeric seal deforms to provide a fluid seal with the adjacent component. In some embodiments an adjacent torch components include a nozzle and a retaining cap.

Any of the aspects above can include one or more of the following features. Some embodiments comprise means for conductive cooling, the means for providing convective cooling, and the sealing means are at least partially located on a single plasma torch component. The means for providing effective convective cooling can be defined between adjacent torch components. And the means for conductive cooling also can provide at least one of radial or axial alignment between the adjacent torch components. In some embodiments the convective or conductive cooling means can comprise a toroidal shape. In some embodiments the fluid-cooled portion comprises a toroidal shape.

The foregoing and other objects, aspects, features, and advantages of the invention will become more apparent from the following description and from the claims.

BRIEF DESCRIPTION OF THE DRAWINGS

These and other features will be more fully understood by reference to the following detailed description when taken in conjunction with the accompanying drawings, which are illustrative and not necessarily to scale.

FIG. 3A is a side elevation view of a nozzle for a plasma arc torch.

FIG. 3B is a cross-sectional perspective view of a torch tip including the nozzle of FIG. 3A.

FIG. 4 is a cross-sectional view of a torch tip including a nozzle with multiple grooves for elastomeric seals.

FIG. 5 is a cross-sectional view of a torch tip.

FIGS. 8A-8E are side elevation cross-sectional views of nozzles for a plasma arc torch.

DETAILED DESCRIPTION

Figure 1A:
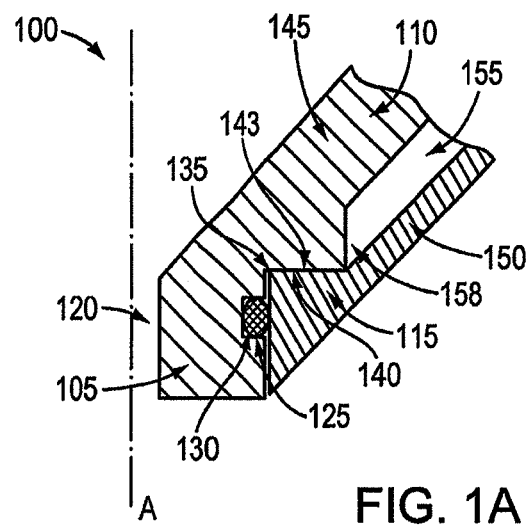
FIG. 1A depicts a partial cross sectional view of a known design of a system for cooling a tip of a nozzle.
Figure 1B:
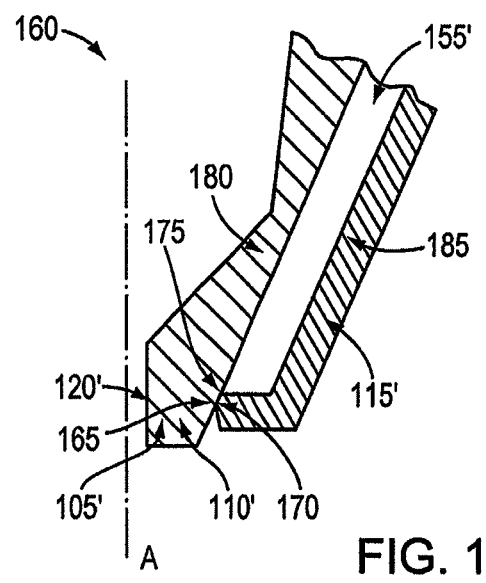
FIG. 1B depicts a partial cross sectional view of a second design of a known system for cooling a tip of a nozzle.
Figure 2:
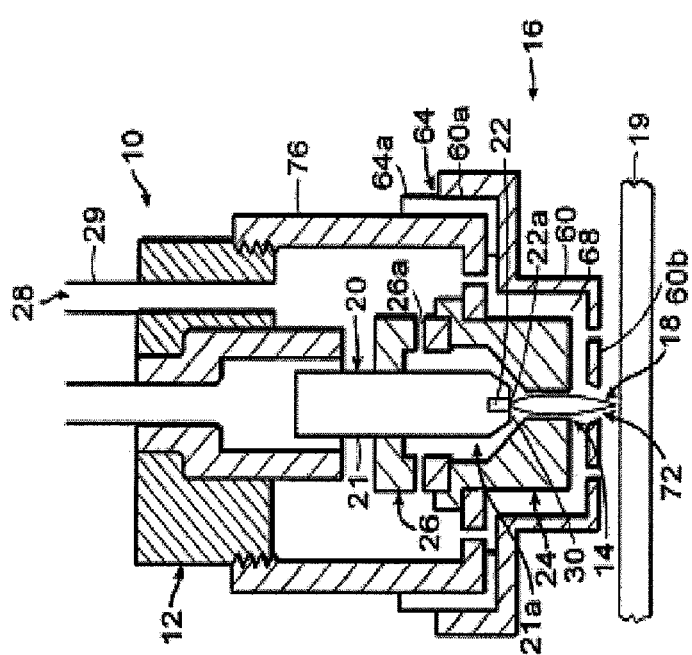
FIG. 2 is a view of a known torch design.

FIG. 2 illustrates in simplified schematic form of a known plasma arc cutting torch 10 representative of any of a variety of models of torches sold by Hypertherm, Inc., with offices in Hanover, N.H. The torch 10 has a body 12 that is typically cylindrical with an exit orifice 14 at a lower end 16. A plasma arc 18, i.e., an ionized gas jet, passes through the exit orifice 14 and attaches to a workpiece 19 being cut. The torch 10 is designed to pierce and cut metal, particularly mild steel, or other materials in a transferred arc mode. In cutting mild steel, transferred plasma arc 18.

The torch body 12 supports a copper electrode 20 having a generally cylindrical body 21. A hafnium insert 22 can be press fit into the lower end 21a of the electrode 20 so that a planar emission surface 22a is exposed. The torch body 12 also supports a nozzle 24 which is spaced from the electrode 20. The nozzle 24 has a central orifice that defines the exit orifice 14. In some embodiments, a swirl ring 26 mounted to the torch body 12 has a set of radially offset (or canted) gas distribution holes 26a that impart a tangential velocity component to the plasma gas flow causing it to swirl. This swirl creates a vortex that constricts the arc 18 and stabilizes the position of the arc 18 on the insert 22. The torch also has a shield 60. The shield 60 is coupled (e.g., threaded at its upper side wall 60a to an insulating ring 64. The insulating ring 64 is coupled (e.g., threaded) at its upper side wall 64a to a cap 76 that is threaded on to the torch body 12. The shield 60 is configured so that it is spaced from the nozzle 24 to define a gas flow passage 68. A front face 60b of the shield 60 has an exit orifice 72 aligned with the nozzle exit orifice 14.

In operation, the plasma gas 28 flows through a gas inlet tube 29 and the gas distribution holes 26a in the swirl ring 26. From there, the plasma gas 28 flows into the plasma chamber 30 and out of the torch 10 through the exit orifice 14 and exit orifice 72. A pilot arc is first generated between the electrode 20 and the nozzle 24. The pilot arc ionizes the gas passing through the nozzle exit orifice 14 and the shield exist orifice 72. The arc then transfers from the nozzle 24 to the workpiece 19 for cutting the workpiece 19. It is noted that the particular construction details of the torch 10, including the arrangement of components, directing of gas and cooling fluid flows, and providing electrical connections can take a wide variety of forms.

FIG. 3A is a side elevation view of a nozzle 200 for a plasma arc torch that represents an embodiment of the invention. The nozzle 200 includes a front or forward portion 202 and a rear portion 204. As depicted, the front portion 202 and the rear portion 204 are integrally formed (e.g., from the same piece of material). In some embodiments, the front portion 202 and the rear portion 204 can be formed from different pieces of material and coupled together (e.g., fixed together by welding or in a cooperative relationship when installed in the torch).

The front portion 202 includes an extensive portion 206 that defines an exit orifice (not shown) through which a plasma jet (not shown) exits the nozzle 200. The front portion 202 also defines a shoulder portion 208. As illustrated, the shoulder portion 208 includes a surface 210. The surface 210 is angled or chamfered symmetrically about centerline A. As illustrated, the surface 210 is disposed relative to the extensive portion 206, but other configurations are possible. The shoulder portion 208 and the surface 210 are used for conductive heat transfer with an adjacent component (not shown). The surface 210 can be in physical, surface-to-surface contact with a corresponding surface (not shown) of the adjacent component for conductive heat transfer. In some embodiments, a medium (not shown) is disposed between the surface 210 and the adjacent component such that surface-to-surface contact does not occur, but thermal connectivity is achieved. The medium can be, for example, a sealing component or a coating.

The illustrated nozzle 200 also defines a groove 212 disposed between the front portion 202 and the rear portion 204. In some embodiments, the groove 212 is disposed adjacent the shoulder portion 208 and a convective cooling portion of a cooling channel 255. The groove 212 can house an elastomeric seal, such as, for example, an o-ring or an angled o-ring (not shown). The elastomeric seal can also be a sealing gasket or a coating. When the nozzle 200 and the adjacent component are installed on the plasma arc torch, surface-to-surface contact between the surface 210 and the corresponding surface of the adjacent component deforms the elastomeric seal to provide a fluid-tight seal between the nozzle 200 and the adjacent component. The fluid-tight seal can help to prevent failure of a convective cooling region, failure of the convective cooling region can result in fluid leaking from the cooling channel 255 of a nozzle 200.

The nozzle 200 also includes a convective portion 214. The convective portion 214 is disposed between the groove 212 and the rear portion 204 of the nozzle 200. When the nozzle 200 is installed in the torch, the convective portion is disposed between the seal and the rear portion 204. In some embodiments the seal is located proximal or adjacent to the cooling channel 255. The convective portion 214 provides a fluid flow path that permits a fluid to flow over an exterior surface 216 of the nozzle 200. The fluid (not shown) promotes convective cooling of the nozzle 200 during operation of the torch. In some embodiments the fluid flow path is defined at least in part by a curvilinear surface. The curvilinear surface can be a portion of a surface of a nozzle or a retaining cap.

The convective portion 214 of the nozzle 200 is shaped to promote convective cooling and to reduce stagnation of the flowing fluid. For example, the convective portion 214 includes a shaped portion 218. In some embodiments the shaped portion 218 is dimensioned and configured to have a curvilinear surface. The shaped portion 218 can define at least a portion of a toroidal chamber 220 centered along the centerline A. During operation, fluid flows through and along the toroidal chamber to promote convective cooling of the nozzle. In some embodiments the cooling fluid enters one side of the toroidal channel, flows around the front portion of the nozzle within the fluid chamber 256 and exits on an opposite side of the nozzle. Convective cooling is promoted both by the reduction in stagnation of the cooling fluid (e.g., liquid or gas) and in addition by the shaped portion 218 which enlarges or extends the surface area that is exposed to the cooling liquid by some embodiments, the shaped portion 218 includes a concave curvilinear portion 222 and a convex curvilinear 224 portion adjacent the concave curvilinear portion 222. The shaped portion 218 can be created through a casting process (e.g., forming the nozzle 200 in a die) or by a removal process (e.g., removing a portion of the nozzle material during manufacture, for example, on a metal lathe) using suitable removal tools. In some embodiments the convective portion of the nozzle is configured and dimensioned to allow the cooling fluid to convectively remove heat from the nozzle. In some embodiments, heat can be conductively transferred through the nozzle from the front portion to the rear portion of the nozzle and convectively transferred from the nozzle with the cooling fluid simultaneously. The shaped portion, including one or more of the curvilinear portions described above, can be radially symmetrical about a longitudinal axis of the nozzle. Thus, a cross-sectional profile can have the shape described above or as illustrated in the figure.

The nozzle 200 includes a groove 224 adjacent the convective portion 214. The groove 224 increases the surface area of the nozzle and facilitates convective cooling and reduces stagnation by introducing some turbulence to the flowing fluid. The nozzle 200 also includes a channel 226 disposed in the rear portion 204.

FIG. 3B is a cross-sectional perspective view of a torch tip 240 including the nozzle 200 of FIG. 3A. The torch tip 240 includes a retaining cap 244. The retaining cap 244 can secure the nozzle 200 to a plasma arc torch and can position the nozzle 200 with respect to centerline A both radially and/or axially. The retaining cap 244 defines an opening 246 configured to mate with the extensive portion 206 of the nozzle. The extensive portion 206 of the nozzle 200 defines a plasma exit port 248 through which a plasma jet (not shown) exits the nozzle from the plasma chamber 250. The retaining cap 244 defines an exterior surface 252 and an interior surface 254. As illustrated and as discussed above, the interior surface 254 is angled to mate with the surface 210 of the shoulder 208 of the nozzle 200. Contact between the interior surface 254 and the surface 210 facilitates thermal conductivity between the nozzle 200 and the retaining cap 244. The surface 210 defines a chamfer that extends along to the shoulder portion 208 of the front 202 of the nozzle 200. By enlarging the surface to surface contact, the thermal conductivity between the nozzle 200 and the retaining cap 244 is improved. Improving the thermal conductivity between two or more torch components improves the cooling of the nozzle which can extend the nozzle life. In some embodiments a layer of conductive material, such as silver, (not shown) is on the surfaces 210, 254 that provide the surface-to-surface contact area. The conductive material can promote heat transfer between adjacent torch components.

When the elastomeric sealing component (not shown) is positioned in the groove 212, cooperation between the retaining cap 244 and the nozzle 200 deform the elastomeric sealing component to form a fluid-tight interface. The interior surface 254 cooperates with the shaped portion 214 and the rear portion 204 of the nozzle 200 to form a fluid chamber 256.

The rear portion 204 of the nozzle 200 also includes a surface 258 defining a groove 260 in the surface 258. An elastomeric sealing component (not shown) can be disposed in the groove 260 when the nozzle 200 is installed in a plasma arc torch. The surface 258 abuts the torch body (not shown) when the nozzle 200 is installed in the torch. The sealing component in the groove 258 provides a back-up seal in the event the sealing components disposed in groove 224 or channel 226 fail. In some embodiments either the seal in groove 258 is used or the seal in groove 226 is used. Additionally, the sealing component in groove 258 is not compromised by scratches in the side wall of the torch body (usually made of brass) resulting from installing and removing nozzle 200 (or other nozzles) from the torch. Instead, the sealing component in groove 258 seals against a rear face of the interior of the torch. The rear face of the interior of the nozzle is less likely to be gouged by repeated changing of the nozzle as compared to the interior side walls of the torch. The sealing component in groove 258 provides a soft interface and reduces metal-to-metal contact between the nozzle 200 and the torch body. Repeated connection and disconnection of the consumable components, including for example, nozzles, retaining caps, electrodes, can gauge and scratch the torch connections. The gauges and scratches can compromise the seal between the fluid cooled region of a plasma arc torch and the plasma gas region. When the seal between the two regions is compromises, fluid intended for cooling can leak into the plasma gas region or vice versa. The sealing component in groove 258 provides a consistent seal that protects the fluid cooled region (fluid flow path), which can include the cooling channel 255, from the plasma gas region. In some embodiments, the sealing component deforms to provide a seal between the two torch regions.

The surface 258 defines a first plane B. The surface 210 defines a second plane C. Both plane B and plane C are in the flow path for a cooling liquid (not shown).

FIG. 4 shows another embodiment of the invention that includes a nozzle 200 and retaining cap 244. The nozzle 200 defines a fluid chamber 256 where the shaped portion 214 of the nozzle 200 includes a convex curvilinear portion 224, a concave curvilinear portion 222. A tangential portion connects the curvilinear portions. In some embodiments, the fluid chamber 256 can be defined by other configurations of one or more curvilinear surfaces. The surface of the curvilinear portions is configured without sharp angles to prevent stagnation zones. In some embodiments the convex curvilinear portion 224 promotes fluid flow toward the concave curvilinear portion 222. The shaped portion 214, including one or more of the curvilinear portions described above, can be radially symmetrical about a longitudinal axis of the nozzle. In some embodiments the shaped surface can have a bulbous shape. Thus, a cross-sectional profile can have the shape described above or as illustrated in the figure.

The shoulder 208 of the nozzle 200 shown in FIG. 4 has a stepped profile. In some embodiments, the stepped profile includes sharp or square angles. The stepped profile of the shoulder 208 increases surface area that promotes conductive heat transfer from the nozzle to the retaining cap 244. In some embodiments, the shoulder 208 and the shaped portion 214 is configured such that the wall of the nozzle has a thickness sufficient to conductively transfer heat from the front portion 202 of the nozzle 200, near the plasma exit port 248, to the rear portion 204 of the nozzle 200.

The nozzle 200 of FIG. 4 can also include a sealing component that prevents fluid flow from passing from the fluid chamber 256 to the front portion 202 of the nozzle, adjacent to the extensive portion 206 of the nozzle 200. A sealing component (not shown) can be partially disposed within a groove 212 and the groove can be cut into the exterior surface 216 of the nozzle. The groove 212 can be located anywhere along the surface of the nozzle. In some embodiments the sealing component can be disposed such that the sealing mechanism is not exposed to elevated temperatures, particularly high temperatures greater than about 250 to 300 degrees F. for sealing components comprising Buna material and 400 degrees F. for sealing components comprising Silicone. The groove 212 with curvilinear or square edges can be cut into the nozzle. In some embodiments, one or more grooves, with associated sealing components, is cut into the surface of the nozzle. In one embodiment, the sealing component is located along the chamfer. In some embodiments the sealing component is located along the shoulder of the nozzle. The sealing component can be located adjacent to the cooling channel and in some embodiments the groove is positioned such that the bottom of the fluid chamber and the top of the groove 212 are adjacent along the exterior surface 216 of the nozzle.

In some embodiments, the extensive portion 206 of the nozzle can extend past the opening 246 of the retaining cap 244. In FIG. 5, for example, the extensive portion 206 extends past the opening 246 of the retaining cap 244. The opening 246 of the retaining cap 244 and the adjacent shoulder 208 of the nozzle 200 can cooperate to provide radially and axial alignment of the adjacent torch components.

During operation of the torch, the extensive portion 206, which can include a chamfer, conductively transfers heat from the front portion 202 of the nozzle 200 towards the rear portion 204 of the nozzle 200. In some embodiments the contact portion of the nozzle and retaining cap is dimensioned and configured to conductively transfer heat between adjacent torch components. In some embodiments, the contact portion is the surface 210 of the shoulder 208 and the interior surface 254 of the retaining cap. The surface-to-surface contact between adjacent torch components facilitates conductive heat transfer. In some embodiments heat can be conductively transferred from a shoulder portion 208 of the nozzle to the retaining cap 244. The surface 210 of the shoulder 208 can have square edges. In some embodiments the surface 210 of the shoulder 208 can be angled or curved. In some embodiments the surface 210 of the shoulder 208 defines a chamfer.

A sealing component can be positioned in a spaced relationship to the shoulder 208 of the nozzle 200. A sealing component can be disposed at least partially within the surface 210 of the shoulder 208. In some embodiments the sealing component can include a groove 212 and an elastomeric seal (not shown) at least partially disposed within the groove 212. In some embodiments the sealing component is an elastomeric seal positioned between the surface of the nozzle 200 and the interior surface 254 of the retaining cap 244. The groove can be cut into the surface of the shoulder if the should is an angled, a curved, or a straight edge. In some embodiments the sealing component is a metal-to-metal interface, between contact surfaces. Regardless of the positioning, the sealing component is intended to prevent fluid flow between the conductive shoulder 208 and a convective cooling channel 255, such as, for example, the fluid chamber 256.

A convective cooling channel 255, that can include a fluid chamber 256, can be defined by the exterior surface 216 of the nozzle and an adjacent torch component. The adjacent torch component can be a retaining cap 244 in some embodiments. The convective cooling channel 255 is intended to minimize stagnation of cooling fluid. In some embodiments fluid flow within the cooling channel will be without stagnation. In some embodiments, without stagnation can also mean reducing or minimizing stagnation as compared to the fluid stagnation within a cooling channel with sharp or square edges or surfaces.

Figure 6:
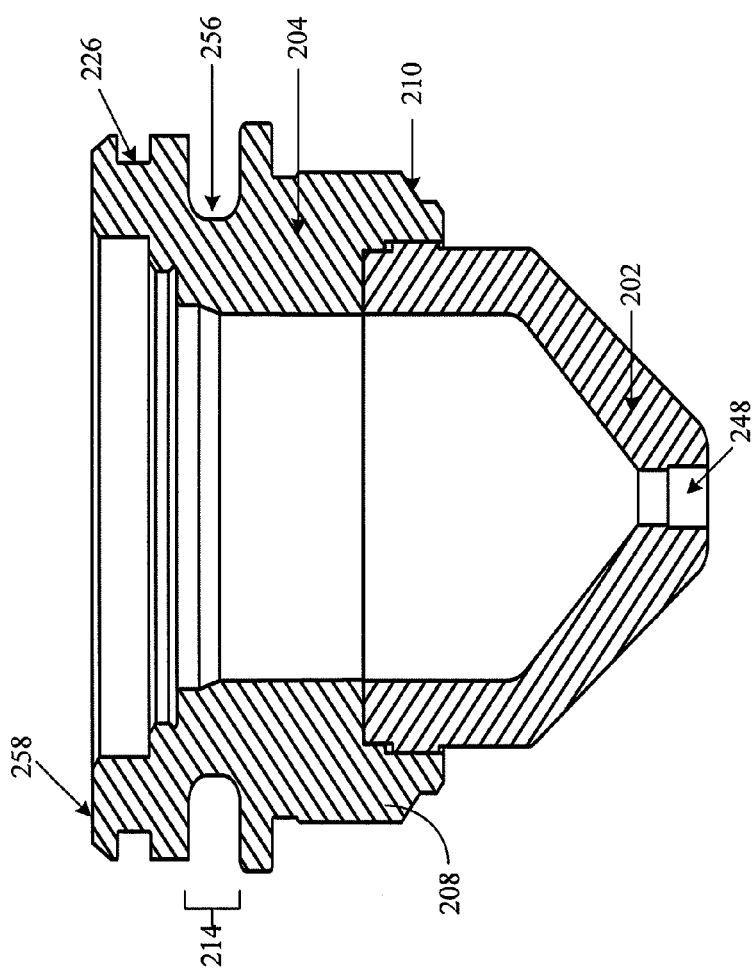
FIG. 6 is a side elevation cross-sectional view of a two-piece nozzle.

As illustrated in FIG. 6, embodiments of the invention include plasma torch components including a nozzle having two portions, where a front portion 202 and a rear portion 204 of the nozzle are formed of different pieces and coupled together. In some embodiments the front portion 202 can include a chamfer. The nozzle 200 can also have a shoulder 208 portion that includes a stepped profile. The chamfer and shoulder can be used together or individually to radially and axially align the nozzle 200 with an adjacent torch component (e.g., a retaining cap or shield). The chamfer can also conductively transfer heat away from the area surrounding the plasma exit port 248 of the nozzle 200.

The front portion 202 of the nozzle 200 and the rear portion 204 of the nozzle 200 can be configured such that heat is conductively transferred from the front portion 202 to the rear portion 204 of the nozzle 200. The exterior surface of the rear portion 204 of the nozzle 200 can define at least in part a cooling channel 255 or fluid chamber 256, whereby the cooling channel convectively removes heat from the rear portion 204 of the nozzle 200. The fluid chamber 256 can be defined by a curvilinear surface formed in the rear portion 204 of the nozzle 200 and a surface of an adjacent torch component that is placed in a spaced relationship with the rear portion 204 of the nozzle 200. In some embodiments, a portion of the cooling channel 255 can be defined by a curvilinear surface formed in the front portion 202 of the nozzle 200 and an adjacent torch component in a spaced relationship with the front portion 202 of the nozzle 200. In some embodiments, at least a portion of the cooling channel 255 is toroidal or bulbously formed. The cooling channel can be concave in respect to the exterior surface 216 of the rear portion 204 of the nozzle 200, in some embodiments the cooling channel will include a concave and convex portion that is connected by a tangential portion. The cooling channel, including one or more of the curvilinear portions described above, can be radially symmetrical about a longitudinal axis of the component. Thus, a cross-sectional profile can have the shape described above or as illustrated in the figure.

Figure 7:
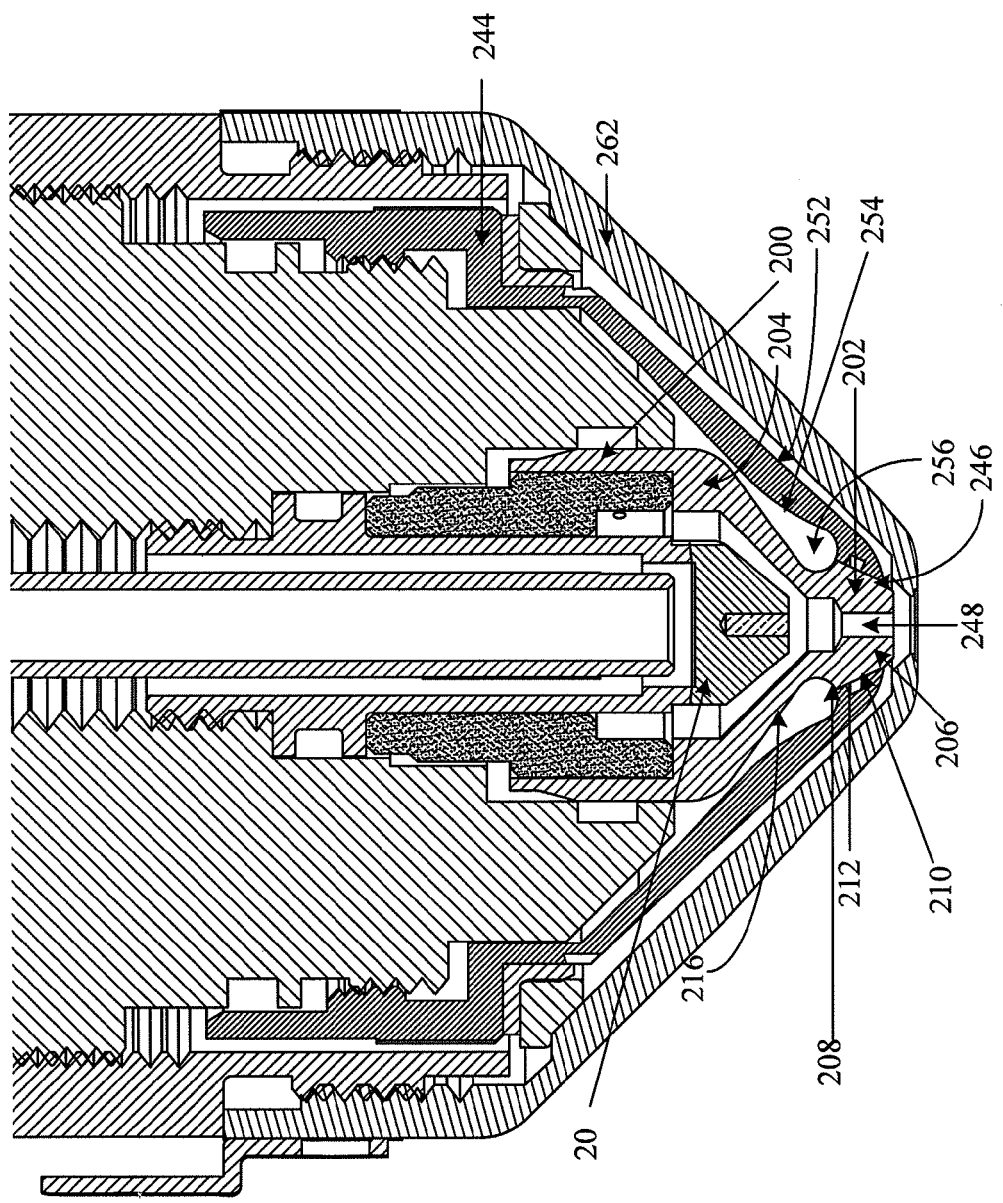
FIG. 7 is side elevation cross-sectional view of a torch tip including an elastomeric seal disposed in a retaining cap.

FIG. 7 is a side view of an embodiment of a torch tip including features of the invention. The illustrated torch tip includes a nozzle 200 with a retaining cap 244 and shield 262. The interior surface 254 of the retaining cap 244 can define a shaped portion. In some embodiments the exterior surface 216 of the nozzle can also define a shaped portion; the shaped portion being a curvilinear surface. The shaped portion of the retaining cap 244 and the exterior surface 216 of the nozzle 200 define a cooling channel. In some embodiments the shaped portion of the retaining cap 244 is configured with a concave surface that promotes fluid flow through the cooling channel. In some embodiments the cooling channel has a bulbous shape, and in some embodiments the channel is toroidal about a longitudinal axis of the retaining cap. The cooling channel is configured to minimize or lessen fluid stagnation in the fluid chamber 256. The shaped portion of the retaining cap 244 can be formed such that it maximizes the convective heat transfer from the nozzle 200 and retaining cap 244 to the cooling fluid. In some embodiments the front end of the cooling channel will be convex or bulbously formed. The shaped portion 214 can be radially symmetrical about a longitudinal axis of the retaining cap. Thus, a cross-sectional profile can be shaped as described above or as illustrated in the figure.

The nozzle 200 can have a front 202 and rear portion 204. The front portion 202 of the nozzle 200 defines an extensive portion 206 and a plasma exit port 248. A retaining cap 244 can be positioned in a space relationship with the nozzle 200 such that the opening 246 of the retaining cap 244 is axially and radially aligned with the extensive portion 206 of the nozzle 200. In some embodiments, a shoulder portion 208 located on the front portion 202 of the nozzle 200 can allow the nozzle 200 to be axially and radially aligned with the retaining cap 244.

The shoulder portion 208 can define a surface 210 that is configured to provide conductive heat transfer with an adjacent torch component. The surface 210 of the shoulder portion 208 can be a chamfer, a conical shape, or a curved surface. In some embodiments the adjacent torch component is a retaining cap 244. The retaining cap 244 has an interior surface area 254 and exterior surface area 252. Contact between the interior surface area 254 of the retaining cap 244 and the surface 210 of the shoulder portion 208 allow for conductive heat transfer from the front portion 202 of the nozzle 200 to the retaining cap 244.

The interior 254 of the retaining cap 244 can define a groove 212; an elastomeric seal or some other sealing component can be at least partially disposed within the groove 212. The sealing component can be positioned such that the contact surface between the retaining cap 244 and nozzle 200 allows for adequate conductive heat transfer. In some embodiments, the sealing component is intended to prevent fluid from passing from a fluid chamber 256 (the fluid chamber can also be referred to as a cooling channel) to the solid-to-solid contact between the interior surface 254 of the retaining cap 244 and the extensive portion of the nozzle 200. In some embodiments, the sealing portion can be located between the shoulder portion 208 and a convective fluid chamber 256.

The location of the sealing component is not limited to the same torch component as the curvilinear surface that defines the fluid chamber 256 and prevents fluid stagnation. In some embodiments, the curvilinear surface that prevents or minimized fluid flow stagnation is located on one torch component and the sealing component including a groove and an elastomeric seal are located on an adjacent torch component. In some embodiments, for example, the sealing component may be located on the nozzle 200 and the fluid chamber 256 is at least partially defined by a curvilinear interior surface 254 of the retaining cap 244. In some embodiments, the sealing component can be located on the retaining cap 244 and the curvilinear surface of the nozzle 200 at least partially defines a cooling channel prevents and minimizes stagnation of fluid flow through the cooling channel.

Other embodiments with varied cooling channel configurations are shown in FIGS. 8A-8E. The curvilinear portion of the cooling channel can include different shaped curvilinear surfaces that at least partially define the cooling channel. The location of the cooling channel in relation to the nozzle and the retaining cap can also be varied to minimize stagnation. In some embodiments the location and configuration of the cooling channel is dimensioned to maximize heat transfer away from the nozzle.

Figure 9:
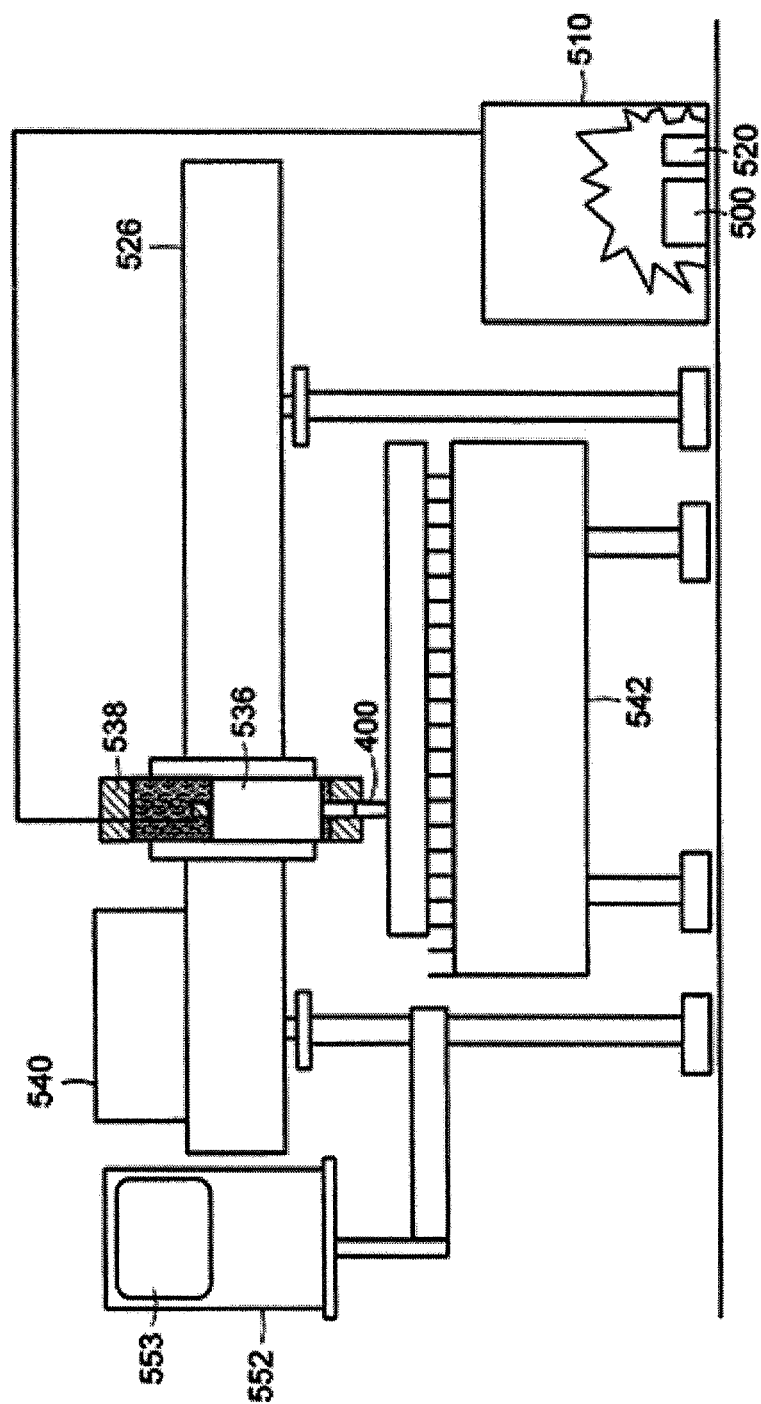
FIG. 9 is a schematic diagram of an automated plasma arc torch system.

Plasma arc systems are widely used for cutting metallic materials and can be automated for automatically cutting a metallic workpiece. In one embodiment, referring to FIGS. 9 and 10, a plasma arc torch system includes a computerized numeric controller (CNC) 552, display screen 553, a power supply 510, an automatic process controller 536, a torch height controller 538, a drive system 540, a cutting table 542, a gantry 526, a gas supply (not shown), a controller 500, a positioning apparatus (not shown), and a plasma arc torch 400. The plasma arc torch system optionally includes a valve console 520. The plasma arc torch 400 torch body 404 includes a nozzle 410 and a retaining cap 244. In operation, the tip of the plasma arc torch 400 is positioned proximate the workpiece 530 by the positioning apparatus.

Figure 10:
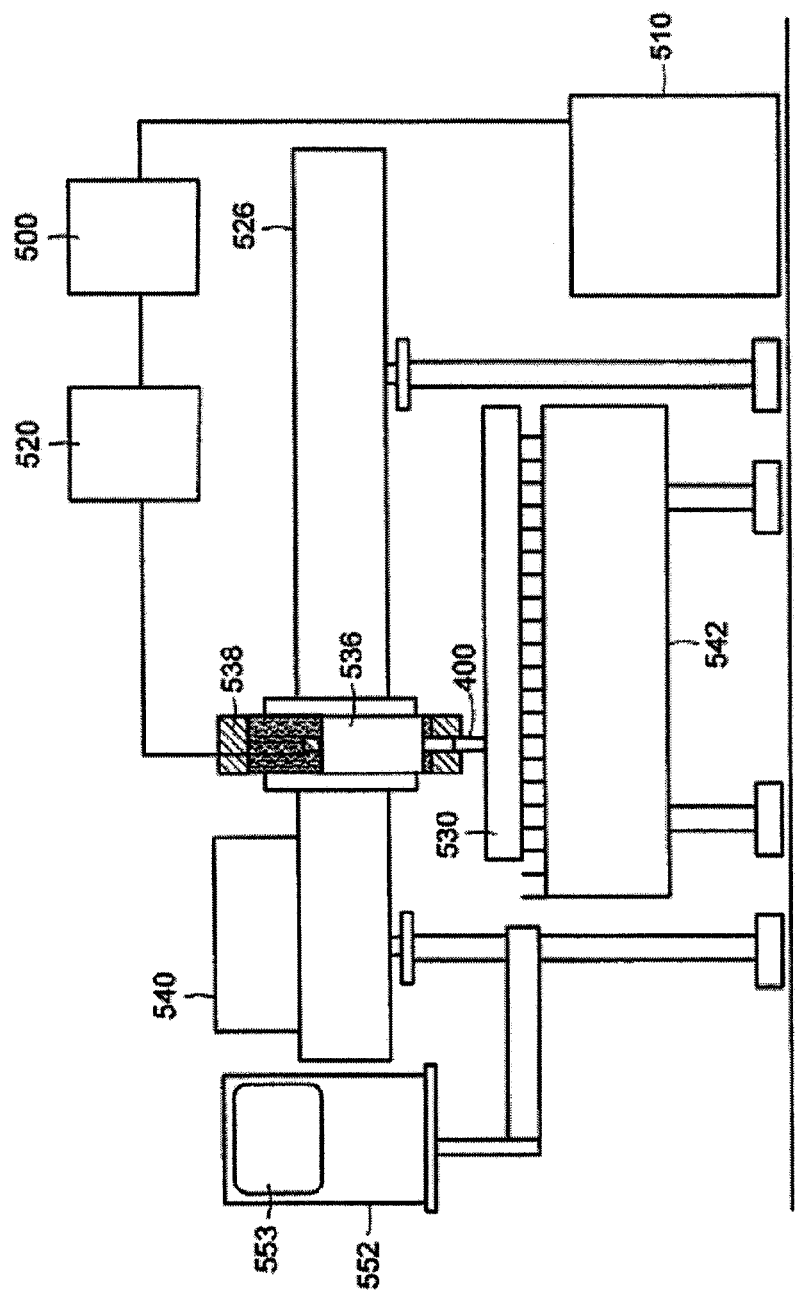
FIG. 10 is a schematic diagram of an automated plasma arc torch system.

The controller can be disposed on the power supply 510, for example, the controller can be housed within the power supply 510, see FIG. 10. Alternatively, the controller 500 can be disposed exterior to the power supply 510 housing, for example, on the exterior of the power supply housing. In one embodiment, see FIG. 10, the controller 500 is connected to a component, for example, a power supply 510. The controller can control signals sent to the torch or torch system. Similarly, the valve console 520 can be disposed on the power supply 510, for example, the valve console 520 can be housed within the power supply 510, see FIG. 10. The valve console 520 can also be disposed exterior to the power supply 510 housing, for example, on the exterior of the power supply housing. In one embodiment, see FIG. 9, the valve console 520 is connected to a component, for example, a power supply 510. The valve console 520 can contain the valves for flowing in and/or venting out the plasma gas, electrode gas, shield gas, and other gases, for example.

In operation, a user places a workpiece 530 on the cutting table 542 and mounts the plasma arc torch 400 on the positioning apparatus to provide relative motion between the tip of the plasma arc torch 400 and the workpiece 530 to direct the plasma arc along a processing path. The torch height control 538 sets the height of the torch 400 relative to the work piece 530. The user provides a start command to the CNC 552 to initiate the cutting process. The drive system 540 receives command signals from the CNC 552 to move the plasma arc torch 400 in an x or y direction over the cutting table 542. The cutting table 542 supports a work piece 530. The plasma arc torch 400 is mounted to the torch height controller 538 which is mounted to the gantry 526. The drive system 540 moves the gantry 526 relative to the table 542 and moves the plasma arc torch 400 along the gantry 526.

The CNC 552 directs motion of the plasma arc torch 400 and/or the cutting table 542 to enable the workpiece 530 to be cut to a desired pattern. The CNC 552 is in communication with the positioning apparatus. The positioning apparatus uses signals from the CNC 552 to direct the torch 400 along a desired cutting path. Position information is returned from the positioning apparatus to the CNC 552 to allow the CNC 552 to operate interactively with the positioning apparatus to obtain an accurate cut path.

The power supply 510 provides the electrical current necessary to generate the plasma arc. The main on and off switch of the power supply 510 can be controlled locally or remotely by the CNC 552. Optionally, the power supply 510 also houses a cooling system for cooling the torch 400. The cooling system can be coupled with the torch through leads (not shown). The leads transfer the cooling fluid from the cooling system to the torch 400. When the cooling system enters the torch 400, it passes to the cooling channel that is defined by the exterior surface 216 of the nozzle and the interior surface of the retaining cap. A sealing component disposed on the rear face of the nozzle provides a barrier that prevents the cooling fluid from leaking into the plasma gas region of the torch. In some embodiments, the interior surface of the retaining cap can have a curvilinear portion. In some embodiments, at least a portion of the exterior surface 216 of the nozzle can be curvilinear, for example the nozzle exterior can have either concave or convex portions. In some embodiments, the convex portion of the nozzle surface promotes fluid flow past the concave portion of the nozzle surface. The cooling channel provides convective cooling of the nozzle near the plasma arc exit orifice. The curvilinear portion of the surface of the cooling channel can be configured to minimize or be without fluid stagnation. Minimizing fluid stagnation in the cooling channel increases the convective heat transfer of heat away from the front portion of the nozzle.

The controller can be used in conjunction with a hand torch, mechanized torch, or other suitable plasma arc torch. In one embodiment, the plasma arc torch system includes a controller disposed on a hand torch power supply, for example, within the housing of the power supply or exterior to the housing of the power supply that is connected to the hand torch by, for example, a lead. In another embodiment, the plasma arc torch system includes a controller 500 connected to a hand torch by, for example, one or more leads between the power supply and the hand torch.

In one embodiment, referring now to FIG. 10, the controller 500 controls a plasma gas valve system (not shown) that prevents plasma gas flow and enables plasma gas flow through the plasma chamber 428. The plasma gas valve system can be a mechanical valve that prevents plasma gas flow and enables plasma gas flow to the plasma chamber 428. Alternatively, the plasma gas valve system can be proportional valves that meter the flow to enable a desired flow rate to be achieved.

In one embodiment, a plasma arc torch includes a torch body 404 connected to a power supply 510. The torch body 404 includes a plasma flow path for directing a plasma gas to a plasma chamber 428 where a plasma arc is formed. A nozzle 416 can be mounted relative to the electrode 100 in the torch body 404 to define the plasma chamber 428. In one embodiment, a bore 128 is disposed in the second end 112 of the electrode body 100 and an insert 132 is located within the bore 128. In one embodiment, an insert 132 is formed of a high thermionic emissivity material, for example, tungsten or hafnium.

In one embodiment, the invention includes a method of cooling a plasma torch component. The method of cooling a plasma torch component includes exchanging heat from a first torch component with an adjacent torch component through a conductive contact portion. The first torch component can be a nozzle or retaining cap and the second torch component can include a nozzle or retaining cap. The method can also include flowing a cooling fluid through a cooling channel having a curvilinear surface. In some embodiments the curvilinear surface can be configured to prevent fluid stagnation. Flowing fluid through a cooling channel can include flowing the fluid from a first side of a torch component around through a fluid chamber and the fluid exiting the cooling channel on an opposite side of the torch component. In some embodiments flowing fluid can include flowing a gas or liquid cooling fluid through the cooling channel. The cooling of a plasma torch component can also include providing a barrier comprising a sealing component between the conductive contact portion and the cooling channel. Providing a barrier can include a sealing groove with a sealing component at least partially disposed therein. In some embodiments providing a seal can include an applied seal or gasket or a sealing component. The sealing component can be an o-ring or elastomeric seal or and angled o-ring.

In one embodiment, the invention includes a method of manufacturing a plasma torch component. A method of manufacturing a plasma torch component can include forming a surface on a first torch component that defines a conductive contact portion for exchanging heat with an adjacent torch component. Forming the surface can include molding, casting, or removal process using suitable tools and materials. The method can also include creating a shaped portion of a cooling channel defined at least in part by one of the first torch component or the adjacent torch component, the shaped portion having a curvilinear surface; and positioning a sealant portion between the surface and the shaped portion. The sealant portion can include a groove, or sealant component. The sealing portion can also include a surface to surface seal or a gasket. An elastomeric seal can also be at least part of a sealing portion in some embodiments.

While the invention has been particularly shown and described with reference to specific embodiments, other aspects of what is described herein can be implemented in cutting systems, welding systems, spray coating systems, and other suitable systems known to those of ordinary skill in the art. It should be understood by those skilled in the art that various changes in form and detail may be made without departing from the spirit and scope of the invention as defined by the appended claims.

What is claimed is:

1. A nozzle for a plasma arc torch comprising:
   an exterior surface defining a conductive contact portion for exchanging heat with an adjacent torch component;
   a curvilinear surface having a concave curvilinear portion defining a fluid flow path to reduce stagnation of a flow fluid, the curvilinear surface facing outward relative to a longitudinal axis of the nozzle; and
   a sealant portion positioned between the conductive contact portion and the fluid flow path, the sealant portion prevents the flow fluid from leaking out of the plasma arc torch,
   wherein the fluid flow path includes at least a portion of a fluid chamber having a convex curvilinear portion, the convex curvilinear portion promoting fluid flow into the concave curvilinear portion.

2. The nozzle of claim 1, wherein the nozzle includes an elastomeric seal disposed within the sealant portion.

3. The nozzle of claim 1 further comprising a face seal on a surface of a rear portion of the nozzle.

4. The nozzle of claim 1, wherein the fluid flow path forms at least a portion of a toroidal chamber.

5. The nozzle of claim 1, wherein the conductive contact portion defines a curved or angled contact surface.

6. The nozzle of claim 5, wherein the contact surface provides axial and radial alignment of the nozzle to the adjacent torch component.

7. The nozzle of claim 1, wherein the conductive contact portion includes a layer of a conductive metal or metal oxide disposed thereon.

8. A convective cooling structure for a plasma arc torch disposed in at least one of a nozzle and a retaining cap of the plasma arc torch, the convective cooling structure comprising:
   a concave curvilinear portion defining at least a portion of a channel;
   a convex curvilinear portion for promoting fluid flow into the concave curvilinear portion; and
   a tangential connection portion disposed between the convex and concave curvilinear portions, wherein the convex curvilinear portion defines at least a portion of a fluid flow path.

9. The convective cooling structure of claim 8, wherein the cooling structure is at least partially disposed within the nozzle.

10. The convective cooling structure of claim 9, wherein the cooling structure is at least partially disposed within the retaining cap.

11. The convective cooling structure of claim 8, wherein the channel is disposed within the nozzle of the plasma arc torch.

12. The convective cooling structure of claim 11, wherein the channel intrudes into a wall thickness of the nozzle.

13. The convective cooling structure of claim 8, wherein the channel is configured to reduce fluid flow stagnation.

14. A nozzle for use in a fluid-cooled plasma torch, the nozzle comprising:
   a body having an outer perimeter that partially defines a fluid channel that has a curvilinear surface having a concave curvilinear portion defining a fluid flow path to reduce stagnation of a flow fluid, the curvilinear surface facing outward relative to a longitudinal axis of the nozzle, the body including an end face, the end face is perpendicular to the longitudinal axis of a component;
   a groove extending at least partially through the end face;
   an elastomeric seal disposed within the groove to provide a barrier between a plasma gas flow and the fluid channel, the elastomeric seal prevents the flow fluid from leaking out of the plasma arc torch,
   wherein the fluid flow path includes at least a portion of a fluid chamber that includes a convex curvilinear portion, the convex curvilinear portion promoting fluid flow into the concave curvilinear portion.

15. The nozzle of claim 14, wherein the elastomeric sealing element comprises an o-ring.

16. The nozzle of claim 14 further comprising a forward portion and a rear portion, the forward portion including a front face defining an exit orifice, a shoulder portion sized to provide conductive heat transfer with an adjacent component, and an elastomeric seal disposed between the shoulder portion and the rear portion, wherein the elastomeric seal deforms to provide a fluid seal with the adjacent component.

17. A fluid cooled plasma arc torch nozzle comprising:
a forward portion and a rear portion, the forward portion including a front face defining an exit orifice;
a conductive shoulder portion sized to axially align with an adjacent component;
a fluid-cooled portion disposed between the shoulder portion and the rear portion, wherein the fluid-cooled portion includes a curvilinear surface having a concave curvilinear portion defining a fluid flow path to reduce stagnation of a flow fluid, the curvilinear surface facing outward relative to a longitudinal axis of the nozzle; and
a sealing member disposed between the liquid cooling portion and the conductive shoulder portion, the sealing member prevents the flow fluid from leaking out of the plasma arc torch,
wherein the fluid flow path includes at least a portion of a fluid chamber that includes a convex curvilinear portion, the convex curvilinear portion promoting fluid flow into the concave curvilinear portion.

18. The nozzle of claim 17 wherein the fluid-cooled portion comprises a toroidal shape.

19. A plasma arc torch system comprising:
a power supply;
a torch body connected to the power supply;
an electrode disposed within the torch body;
a torch component with a surface defining a conductive contact portion for exchanging heat with an adjacent torch component and a convective cooling structure comprising a concave curvilinear portion that defines at least a portion of a cooling channel and a convex curvilinear portion, the convex curvilinear portion promoting fluid flow into the concave curvilinear portion.

20. The plasma arc torch system of claim 19 further comprising a sealing component dimensioned and configured to provide a fluid seal between the conductive contact portion and the convective cooling structure.

21. The plasma arc torch system of claim 19 wherein the sealing component is located on at least one of the torch component or the adjacent torch component.

22. The plasma arc torch system of claim 19 further comprising a controller and gas console.

23. A method of cooling a plasma torch component comprising:
exchanging heat from a nozzle with an adjacent torch component through a conductive contact portion;
flowing a cooling fluid through a cooling channel having a curvilinear surface, the curvilinear surface configured to reduce stagnation of the cooling fluid, the curvilinear surface facing outward relative to a longitudinal axis of the nozzle; and
providing a barrier comprising a sealing component between the conductive contact portion and the cooling channel, the barrier prevents the cooling fluid from leaking out of the plasma arc torch,
wherein a fluid flow path includes at least a portion of a fluid chamber that includes a convex curvilinear portion, the convex curvilinear portion promoting fluid flow into the concave curvilinear portion.

* * * * *